United States Patent
Han et al.

(10) Patent No.: US 12,381,239 B2
(45) Date of Patent: Aug. 5, 2025

(54) METHOD FOR CONTROLLING COMPENSATION FOR AIR FLOW RATE DURING DISCHARGE OF HYDROGEN OFF-GAS IN FUEL CELL SYSTEM AND APPARATUS USING THE SAME

(71) Applicants: Hyundai Motor Company, Seoul (KR); Kia Corporation, Seoul (KR)

(72) Inventors: Sang Wook Han, Seoul (KR); Dae Jong Kim, Yongin-Si (KR); Jae Won Jung, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 683 days.

(21) Appl. No.: 17/860,397

(22) Filed: Jul. 8, 2022

(65) Prior Publication Data
US 2023/0035889 A1 Feb. 2, 2023

(30) Foreign Application Priority Data
Jul. 29, 2021 (KR) .................. 10-2021-0100183

(51) Int. Cl.
*H01M 8/04746* (2016.01)
*H01M 8/04119* (2016.01)
*H01M 8/0438* (2016.01)
*H01M 8/0444* (2016.01)

(52) U.S. Cl.
CPC ... *H01M 8/04753* (2013.01); *H01M 8/04149* (2013.01); *H01M 8/04388* (2013.01); *H01M 8/04455* (2013.01)

(58) Field of Classification Search
None
See application file for complete search history.

(56) References Cited

U.S. PATENT DOCUMENTS

2008/0261089 A1* 10/2008 Nonobe ............ H01M 8/04805 429/411
2015/0180065 A1* 6/2015 Kwon ............... H01M 8/04231 429/444
2015/0295255 A1* 10/2015 Bae ................... H01M 8/04231 429/446

(Continued)

FOREIGN PATENT DOCUMENTS

KR 10-2020-0068460 6/2020

*Primary Examiner* — Haroon S. Sheikh
(74) *Attorney, Agent, or Firm* — Morgan, Lewis & Bockius LLP

(57) ABSTRACT

A device for controlling compensation for an air flow rate upon discharge of hydrogen off-gas and a method for controlling compensation for an air flow rate using the same is an air flow rate control device configured to control a flow rate of air supplied to a fuel cell cathode through an air supply unit of a fuel cell system, wherein the air flow rate control device is configured to determine whether a fuel discharge valve of the fuel cell system is opened and determine a fuel diffusion amount per unit time, wherein the fuel diffusion amount corresponds to an amount of the hydrogen off-gas discharged through the fuel discharge valve and diffused into an air supply unit through a humidifier, and compensate a target air flow rate depending on an oxygen concentration reduction proportion, determined according to the determined fuel diffusion amount per unit time and flow rate information of the air supply unit.

15 Claims, 4 Drawing Sheets

(56) References Cited

U.S. PATENT DOCUMENTS

| | | | | |
|---|---|---|---|---|
| 2016/0190620 A1* | 6/2016 | Kwon | ............... | H01M 8/04388 |
| | | | | 429/444 |
| 2017/0288245 A1* | 10/2017 | Lee | .................. | H01M 8/04992 |
| 2019/0016233 A1* | 1/2019 | Jeon | ................. | H01M 8/04228 |

* cited by examiner

METHOD FOR CONTROLLING COMPENSATION FOR AIR FLOW RATE DURING DISCHARGE OF HYDROGEN OFF-GAS IN FUEL CELL SYSTEM AND APPARATUS USING THE SAME

CROSS-REFERENCE TO RELATED APPLICATION

The present application claims priority to Korean Patent Application No. 10-2021-0100183, filed on Jul. 29, 2021, the entire contents of which is incorporated herein for all purposes by this reference.

BACKGROUND OF THE PRESENT DISCLOSURE

Field of the Present Disclosure

The present disclosure relates to a method for controlling compensation for an air flow rate upon discharge of hydrogen off-gas, and more particularly, a method for controlling compensation for an air flow rate upon discharge of hydrogen off-gas in relation to an air flow rate of an air supply unit in a fuel cell system, and a device for controlling compensation for an air flow rate using the method.

Description of Related Art

A fuel cell is an energy conversion device that converts chemical energy of fuel into electrical energy through electrochemical reaction of the chemical energy, rather than converting the chemical energy into heat by combustion, and may be used to supply power for small electrical/electronic products and portable devices as well as power for industrial, domestic, and vehicular use.

A polymer electrolyte membrane fuel cell (PEMFC) having a high power density includes a membrane-electrode assembly (MEA), which is a major component, in the innermost portion thereof, wherein the membrane electrode assembly includes a solid polymer electrolyte membrane configured to transfer protons, and a cathode and an anode, which are electrode layers coated with a catalyst facilitating hydrogen and oxygen to react with each other, and are disposed on both surfaces of the polymer electrolyte membrane.

High-pressure hydrogen supplied from a hydrogen tank in a hydrogen supply unit is supplied to a fuel cell stack after reduction of pressure to a predetermined level. The pressure-reduced hydrogen is supplied to the fuel cell stack in an amount which is controlled through pressure control, performed in consideration of the operation conditions of the fuel cell stack. Furthermore, hydrogen remaining after the reaction in the fuel cell stack is recycled to the anode by a hydrogen-recycling device.

Meanwhile, an air supply unit is configured to supply external air to the stack, and humidifies dry air supplied through an air compressor using a humidifier and supplies the air to the cathode of the fuel cell. The exhaust gas of the cathode is humidified by a water component produced therein and is transferred back to the humidifier, which may be used to humidify the dry air to be supplied to the cathode by the air compressor.

In the air supply unit of such a fuel cell system, the amount of air supplied to the stack is generally adjusted to realize a target air flow rate depending on the current required for the stack and the current required for peripheral devices (balance of plant, BOP).

However, when air is supplied at the target air flow rate, determined experimentally in consideration of the current required for the stack and the current required for peripheral devices, the desired level of air supply amount is not satisfied; for example, a lower concentration of oxygen or a higher concentration of hydrogen in the air may actually be supplied to the stack, thus causing problems of deterioration of output performance of the stack and degradation of durability.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to predicting the extent to which a fuel off-gas, which is discharged to a shell of a humidifier upon opening of a fuel discharge valve, is incorporated into the air supplied to a stack, and lowers an oxygen concentration, and to appropriately adjust the target air flow to a level at which the oxygen concentration is not lowered.

Various aspects of the present disclosure are directed to providing an improved method and device configured for controlling compensation for an air flow rate that are configured for preventing deterioration in the output performance of the fuel cell and degradation of durability thereof by performing air supply depending on the target air flow rate newly adjusted in consideration of the estimated amount of exhaust gas and the degree of hydrogen diffusion in the humidifier when the hydrogen off-gas from the hydrogen supply unit of the fuel cell system is discharged.

In accordance with various aspects of the present disclosure, the above and other objects may be accomplished by the provision of a method for controlling compensation for an air flow rate upon discharge of a hydrogen off-gas, the method including determining whether a fuel discharge valve of a fuel cell system is opened, determining a fuel diffusion amount per unit time, wherein the fuel diffusion amount corresponds to an amount of the hydrogen off-gas discharged through the fuel discharge valve and then diffused into an air supply unit through a humidifier, determining an oxygen concentration reduction proportion from the determined fuel diffusion amount per unit time and flow rate information of the air supply unit, and compensating a target air flow rate according to the determined oxygen concentration reduction proportion.

The method may further include controlling a number of rotations of an air compressor based on the compensated target air flow rate, and determining whether the fuel discharge valve is closed, terminating the compensating of the target air flow rate when the fuel discharge valve when the fuel discharge valve is closed, and returning the air flow rate to a target air flow rate determined according to a predetermined air flow rate map.

The humidifier may be a membrane humidifier, and the fuel diffusion amount per unit time may be determined according to a membrane permeability and a hydrogen concentration gradient between a shell and a lumen of the membrane humidifier.

The method may further include determining a delay time based on a velocity of gas discharged through the fuel discharge valve and a length of a pipe between the fuel discharge valve and the humidifier, before determining the fuel diffusion amount per unit time, and the compensating of the target air flow rate may include initiating the compensating of the target air flow rate after the delay time elapses.

The method may further include controlling a number of rotations of an air compressor based on the compensated target air flow rate, and determining whether the fuel discharge valve is closed, terminating the compensating of the target air flow rate when the fuel discharge valve is determined to be closed and the delay time then elapses, and returning the air flow rate to a target air flow rate determined according to a predetermined air flow rate map.

In accordance with another aspect of the present disclosure, provided is a device configured for controlling compensation for an air flow rate upon discharge of a hydrogen off-gas, the device being an air flow rate control device configured to control a flow rate of air supplied to a fuel cell cathode through an air supply unit of a fuel cell system, wherein the air flow rate control device is configured to determine whether a fuel discharge valve of the fuel cell system is opened and determine a fuel diffusion amount per unit time, wherein the fuel diffusion amount corresponds to an amount of the hydrogen off-gas discharged through the fuel discharge valve and diffused into an air supply unit through a humidifier, and compensate a target air flow rate depending on an oxygen concentration reduction proportion, determined according to the determined fuel diffusion amount per unit time and flow rate information of the air supply unit.

The air flow rate control device may be configured to control a number of rotations of an air compressor based on the compensated target air flow rate, determine whether the fuel discharge valve is closed and terminate the compensating the target air flow rate when the fuel discharge valve is closed, and return the air flow rate to a target air flow rate determined according to a predetermined air flow rate map when the compensating of the target air flow rate is terminated and control the number of rotations of the air compressor.

The humidifier may be a membrane humidifier, and the air flow rate control device may be configured to determine the fuel diffusion amount per unit time according to a membrane permeability and a hydrogen concentration gradient between a shell and a lumen of the membrane humidifier.

The air flow rate control device may be further configured to determine a delay time based on a velocity of gas discharged through the fuel discharge valve and a length of a pipe between the fuel discharge valve and the humidifier, and initiate the compensating of the target air flow rate after the delay time elapses.

The air flow rate control device may be configured to control a number of rotations of the air compressor based on the compensated target air flow rate, determine whether the fuel discharge valve is closed and terminate the compensating the target air flow rate when the fuel discharge valve is determined to be closed and the delay time then elapses, and return the air flow rate to a target air flow rate determined according to a predetermined air flow rate map when the compensating of the target air flow rate is terminated and control the number of rotations of the air compressor.

In accordance with another aspect of the present disclosure, provided is a fuel cell system including a fuel cell including an anode and a cathode, a hydrogen supply unit configured to supply hydrogen to the anode, an air supply unit configured to supply air to the cathode, and an air flow rate control device configured to control a target flow rate of air supplied to the air supply unit, wherein the hydrogen supply unit includes a fuel discharge valve connected to a hydrogen supply and configured to discharge a hydrogen off-gas, the air supply unit includes a humidifier configured to humidify air supplied to the cathode, an air compressor configured to pressurize air into the humidifier, and an air flow rate detector configured to detect a flow rate of air supplied to the air supply unit, and the air flow rate control device is further configured to determine whether a fuel discharge valve of the fuel cell system is opened and determine a fuel diffusion amount per unit time when the fuel discharge valve is determined to be opened, wherein the fuel diffusion amount corresponds to an amount of the hydrogen off-gas discharged through the fuel discharge valve and diffused into an air supply unit through a humidifier, and compensate a target air flow rate depending on an oxygen concentration reduction proportion determined from the determined fuel diffusion amount per unit time and flow rate information of the air supply unit.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
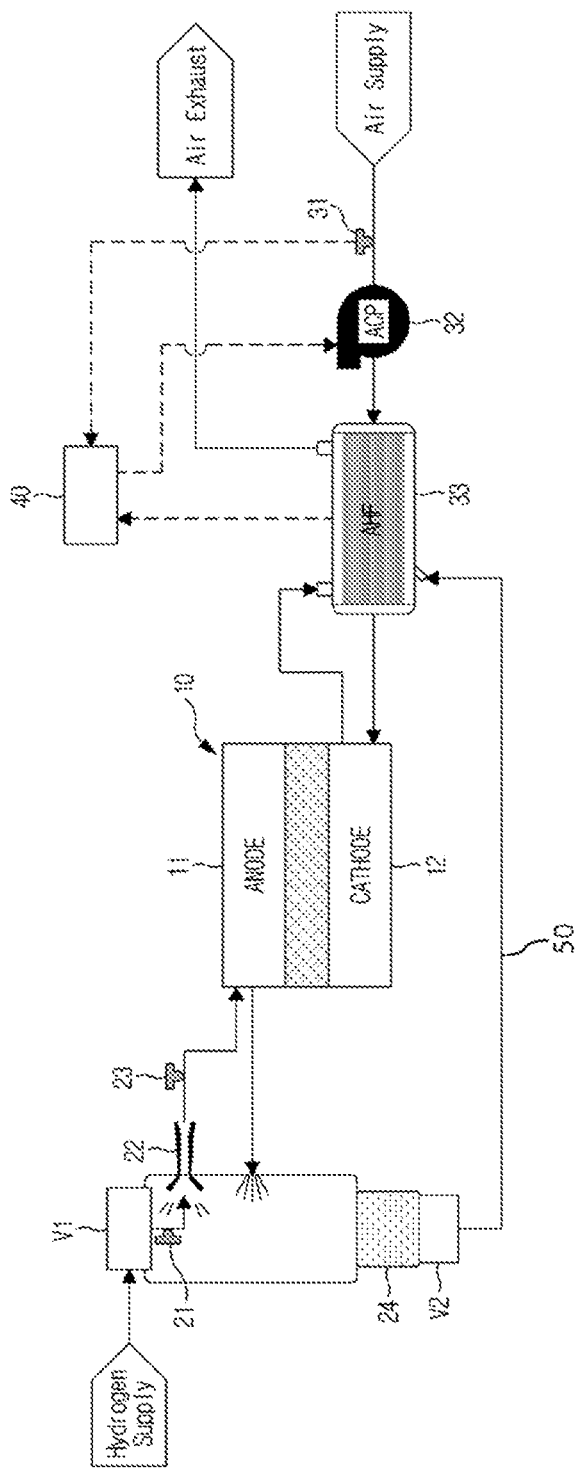
FIG. 1 is a diagram illustrating the configuration of a fuel cell system to which a device configured for controlling compensation for an air flow rate is applied when hydrogen off-gas is discharged according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a device and method for controlling compensation for an air flow rate when hydrogen off-gas is discharged according to various exemplary embodiments of the present disclosure will be described in detail with reference to the accompanying drawings.

Figure 2:
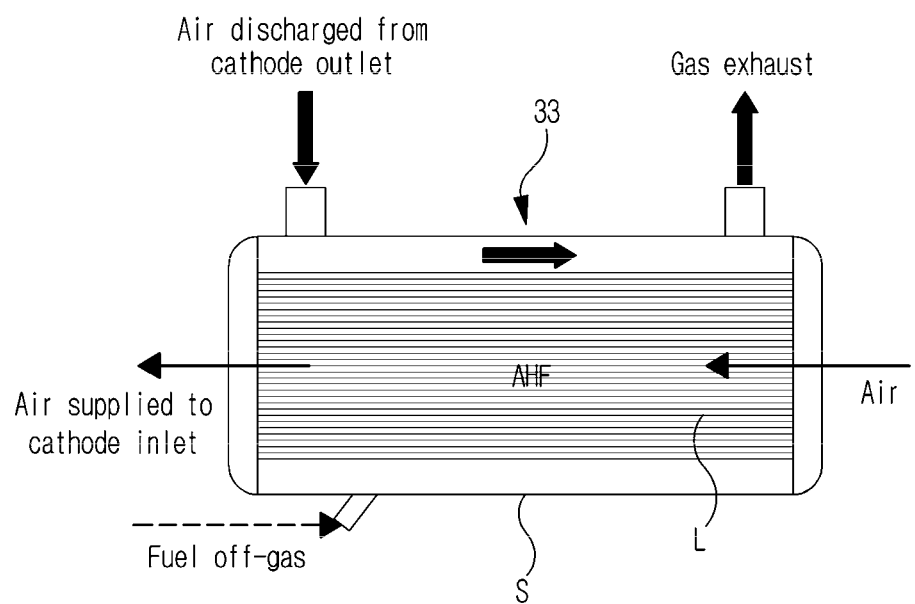
FIG. 2 is a diagram illustrating gas flow inside a humidifier of an air supply unit.

FIG. 1 is a diagram illustrating the configuration of a fuel cell system to which the device configured for controlling compensation for an air flow rate is applied when hydrogen off-gas is discharged according to various exemplary embodiments of the present disclosure, and FIG. 2 is a diagram illustrating gas flow inside a humidifier of an air supply unit.

Referring to FIG. 1, a hydrogen supply unit configured to supply hydrogen is connected to an anode 11 of a fuel cell stack 10, and an air supply unit configured to supply air is connected to a cathode 12.

The air supply unit draws, compresses, and humidifies external air and then supplies the air to the cathode 12. At the instant time, the air passing through the cathode 12 reacts with the hydrogen on the anode 11, thus producing electricity.

The hydrogen supply unit includes a hydrogen supply source (a pressure vessel in which hydrogen is stored) and an ejector 22, configured to eject air supplied from the hydrogen supply source to the anode 11. Furthermore, the hydrogen supply unit may further include a fuel supply valve V1 configured to control the supply of fuel from the hydrogen supply source to the ejector. Hydrogen supplied from the hydrogen supply source is supplied to the anode 11 through the ejector 22 when the fuel supply valve V1 is opened.

Among the hydrogen supplied to the anode 11, some hydrogen not participating in the reaction may be recycled to the front end portion of the anode 11 and supplied to the anode 11 again. Meanwhile, some hydrogen not participating in the reaction may be discharged to the outside; for example, unreacted hydrogen may be discharged to the outside along with condensed water in the anode 11. Furthermore, the hydrogen supply unit may further include, at an anode outlet, a water trap 24 configured to collect the condensed water.

The water trap 24 may include a water level detector configured to detect a water level in the water trap. When the water level detector determines that the level of the condensed water is higher than or equal to a threshold, the condensed water may be discharged to the outside through the fuel discharge valve V2 disposed under the water trap 24. In the instant case, gas such as hydrogen off-gas from the anode outlet as well as condensed water may be discharged through the fuel discharge valve V2.

Meanwhile, a plurality of pressure detectors configured to detect pressure may be provided at the front and rear end portions of the ejector 22. A nozzle pressure detector as a first pressure detector 21 may be provided between the fuel supply valve V1 and the ejector 22, and an anode pressure detector as a second pressure detector 23 may be provided at each of the rear end portion of the ejector and the front end portion of the anode inlet.

The amount of hydrogen off-gas discharged to the fuel discharge valve V2, that is, the gas discharge of the anode, may be estimated using the nozzle pressure detector, which is the first pressure detector 21. The amount of hydrogen off-gas discharged to the fuel discharge valve V2 may be used to determine the anode hydrogen concentration and determine the time at which to close the fuel discharge valve V2. Furthermore, the second pressure detector 23, corresponding to the anode pressure detector, may be used to determine the hydrogen supply amount through control of the proportional integral (PI) of pressure.

Meanwhile, the air supply unit is configured to draw air from the air supply source and supply the air to the cathode. As shown in FIG. 1, in the case of air supplied to the cathode of the fuel cell, dry air supplied through the air compressor is supplied to the cathode in a sufficiently humidified state after having passed through the humidifier. In such an air supply unit, an air flow rate control device 40 may be configured to determine a target air flow rate depending on a predetermined air flow rate map based on the current required for the stack and the current required for peripheral devices (BOP).

The determined target air flow rate is used to determine the rotation speed of the air compressor 32, and air is supplied to the humidifier and the cathode by the air compressor. Furthermore, a flow rate detector 31 is provided in the air supply unit, and information on the supplied air flow rate may be detected using the flow rate detector 31.

The humidifier may be a membrane humidifier including a hollow fiber membrane. The dry air drawn in from the outside is humidified while passing through an internal lumen of the humidifier 33, passes through the fuel cell cathode, and participates in the reaction. Meanwhile, the air that has passed through the cathode and underwent the reaction is exhausted through an external shell of the humidifier 33.

Also, as shown in FIG. 1, because the hydrogen off-gas of the hydrogen supply unit is discharged through the fuel discharge valve V2, the hydrogen concentration of the hydrogen supply unit may be maintained. At the instant time, to dilute the hydrogen off-gas and humidify the dry air supplied through the air supply unit, as shown in FIG. 1, the fuel discharge valve V2 may be connected to the humidifier 33 via a pipe 50 to deliver the hydrogen off-gas to a shell inlet of the humidifier.

The gas flow in the humidifier is shown in more detail in FIG. 2.

As shown in FIG. 2, regarding the direction of gas in the humidifier, the gas supplied to the fuel cell stack and the exhaust gas discharged from the cathode after the reaction in the fuel cell stack flow in opposite directions. Determining the gas flow direction inside the humidifier as described above aims to improve the humidification performance of the humidifier by increasing the membrane permeability. This is because the membrane permeability may be increased when the gas flows in opposite directions, compared to the case where the gas flows in one direction due to the inherent characteristics of the hollow fiber membrane. As described above, humidification performance may be improved by setting the gas flow in opposite directions.

In relation to the internal structure of the humidifier, it may be ideal for only water vapor ($H_2O$) to be transferred from the external shell S to the internal lumen L of the humidifier. However, when the hydrogen off-gas is discharged through the fuel discharge valve V2, a hydrogen concentration gradient from the inside to the outside of the humidifier increases, which may cause a problem in which the diffusion velocity of hydrogen molecules increases. In the instant case, in a specific situation, such as when the air flow rate is low, when the hydrogen off-gas is discharged, hydrogen is introduced into the humidifier, so a gas having a higher hydrogen concentration than in the atmosphere may be introduced into the stack. For the present reason, the hydrogen-oxygen reaction at the cathode may deteriorate the output performance and durability of the stack.

That is, according to a general air flow rate control method, a target air flow rate is determined according to the stack demand current and the BOP consumption current. In contrast, when the air supply is controlled depending on the determined target air flow rate, the concentration of oxygen in the air supplied to the stack may be decreased, or the concentration of hydrogen in the air may be increased, leading to deterioration in the output performance and durability of the stack.

On the other hand, the present disclosure is characterized in that deterioration in the output performance of the stack and degradation of durability thereof are prevented by performing compensation for a target air flow rate during discharge of the hydrogen off-gas by the air flow rate control device 40 and driving the air compressor 32 depending on the compensated target air flow rate.

The control of compensation of the target air flow rate by the air flow rate control device 40 may be performed in consideration of the estimated amount of gas discharged through the fuel discharge valve V2 and the degree of hydrogen diffusion in the humidifier hollow fiber membrane.

A specific example in which the compensation for the target air flow rate is controlled by the air flow rate control device in relation to the device configured for controlling compensation for an air flow rate when discharging hydrogen off-gas according to various exemplary embodiments of the present disclosure will be described in detail with reference to the accompanying flowcharts of FIG. 3 and FIG. 4.

The method for controlling compensation for an air flow rate upon discharge of a hydrogen off-gas according to various exemplary embodiments of the present disclosure includes determining whether or not a fuel discharge valve of a fuel cell system is opened, determining a fuel diffusion amount per unit time, wherein the fuel diffusion amount corresponds to an amount of hydrogen off-gas discharged through the fuel discharge valve and diffused into an air supply unit through a humidifier, determining an oxygen concentration reduction proportion based on the determined fuel diffusion amount per unit time and flow rate information of the air supply unit, and compensating a target air flow rate according to the determined oxygen concentration reduction proportion.

Furthermore, in various exemplary embodiments of the present disclosure, the compensating of the target air flow rate may include determining the velocity of the exhaust gas based on the exhaust amount of the hydrogen-electrode-based off-gas and estimating the time taken to introduce the hydrogen off-gas into the humidifier based on the determined gas velocity. The time estimated through the process may be taken into consideration when determining the start time and end time of compensation control.

Figure 3:
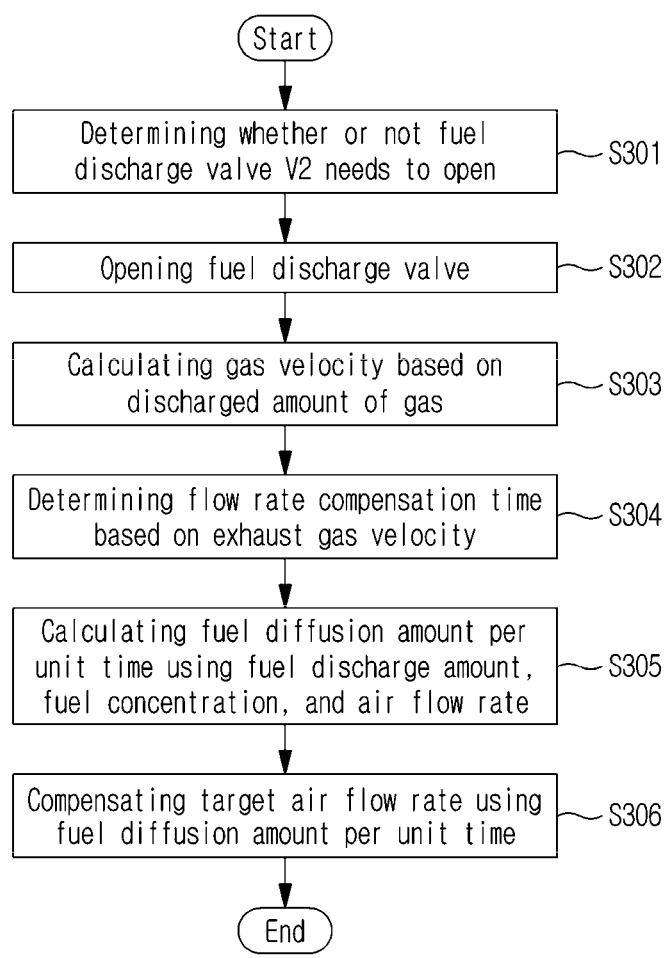
FIG. 3 is a flowchart illustrating the concepts of respective steps of a method for controlling compensation for an air flow rate when hydrogen off-gas is discharged according to various exemplary embodiments of the present disclosure.

FIG. 3 is a flowchart illustrating the concepts of respective steps of a method for controlling compensation for an air flow rate when hydrogen off-gas is discharged according to various exemplary embodiments of the present disclosure.

As shown in FIG. 3, in various exemplary embodiments of the present disclosure, the method starts from determining whether or not a fuel discharge valve V2 is opened through steps such as determining whether or not the fuel discharge valve V2 needs to open (S301) and opening the fuel discharge valve V2 (S302).

The method may further include, after these steps, determining the gas velocity based on the amount of gas discharged through the fuel discharge valve (S303), determining the flow rate compensation time depending on the determined gas velocity (S304), determining the fuel diffusion amount per unit time using the discharge amount and concentration of the fuel and the flow rate of the air supplied to the stack (S305) and determining a target air flow rate compensation value using the fuel diffusion amount per unit time (306). The control of compensation of the target air flow rate may be implemented through these steps.

Furthermore, in another exemplary embodiment of the present disclosure, in relation to the determination of the start time and end time of air flow rate compensation, whether or not to compensate the air flow rate may be determined based on the opening and closing times of the fuel discharge valve. This case may cause a problem in which the time required for the gas discharged through the fuel discharge valve to reach the humidifier and diffuse to the hollow fiber membrane at the center of the humidifier is not accurately considered. However, it may be considered that the time taken from the opening of the fuel discharge valve to the diffusion of gas in the humidifier is relatively short, and there may be a time delay required for the target flow rate to be actually compensated and controlled through the air flow rate compensation control. Accordingly, according to another example of the present disclosure, to simplify the logic for controlling compensation for the target air flow rate, opening and closing times of the fuel discharge valve may be set as start and end times of the compensation control, respectively. In the instant case, the control of compensation for air target flow rate may be performed through steps (S305) and (S306), excluding the steps of determining gas velocity (S303) and determining the flow rate compensation time (S304), from the above-mentioned steps, by setting start and end times of air flow rate compensation control as opening and closing times of the fuel discharge valve, respectively.

Figure 4:
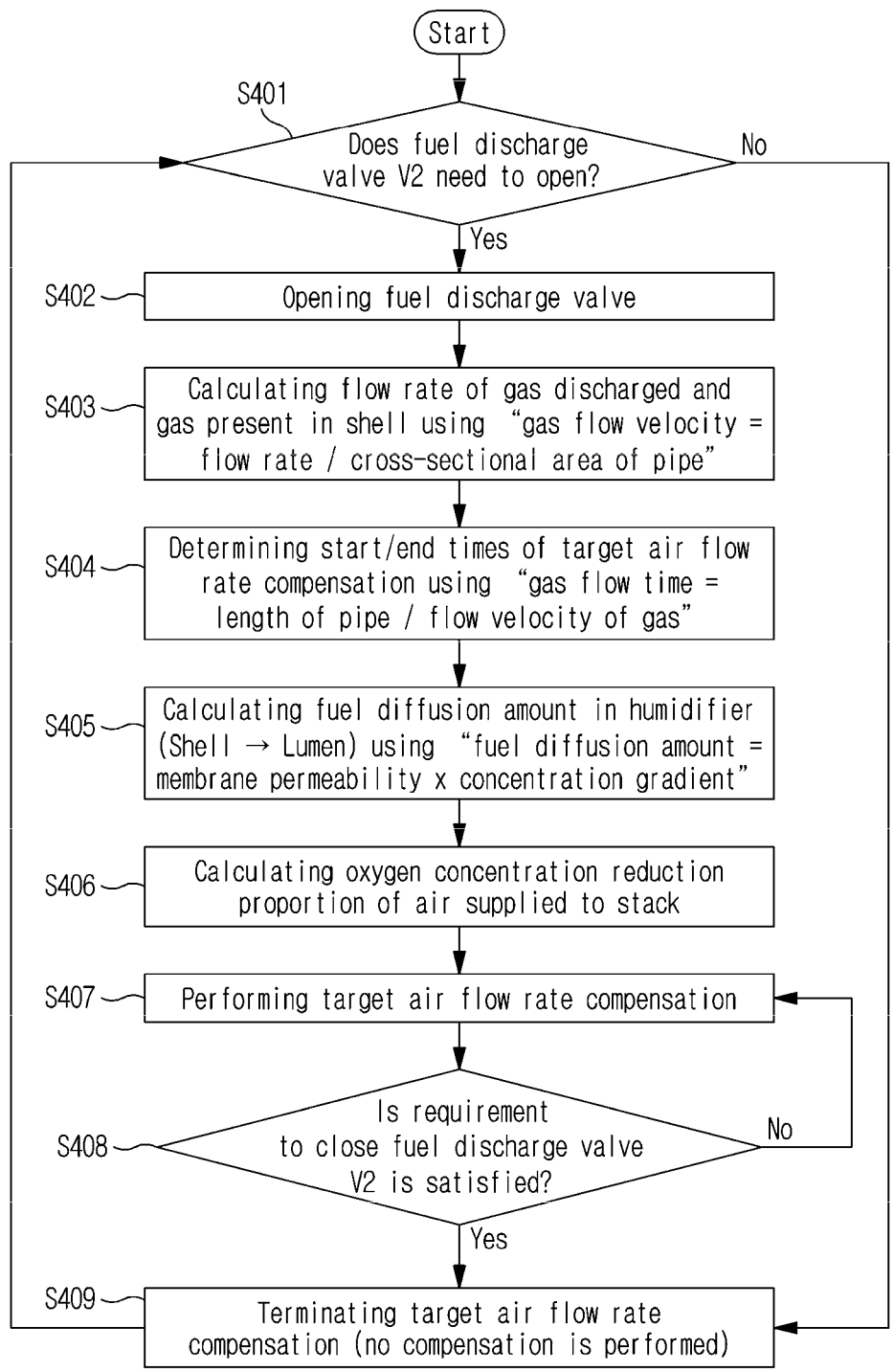
FIG. 4 is a flowchart illustrating details of the respective steps of the method for controlling compensation for an air flow rate when hydrogen off-gas is discharged according to various exemplary embodiments of the present disclosure.

FIG. 4 is a flowchart illustrating details of the respective steps of the method for controlling compensation for an air flow rate when hydrogen off-gas is discharged according to various exemplary embodiments of the present disclosure. Details of the respective steps of FIG. 3 will be described with reference to FIG. 4.

As shown in FIG. 4, whether or not the fuel discharge valve V2 needs to be opened while the fuel cell system is being driven (S401) is determined. The anode hydrogen concentration is estimated to maintain the hydrogen concentration of the hydrogen supply unit at a predetermined level. When the estimated anode hydrogen concentration value falls below the predetermined level, the fuel discharge valve is opened, performing control to restore the anode hydrogen concentration. Accordingly, the fuel cell controller is configured to perform control to open the fuel discharge valve when the predetermined condition is satisfied (S402).

Meanwhile, according to various exemplary embodiments of the present disclosure, when the fuel discharge valve is determined to be opened, a series of steps for compensating the target air flow rate are performed by the air flow rate control device.

The flow rate at which gas is discharged through the fuel discharge valve and the flow rate of gas on the shell are determined (S403), and the time taken to introduce the discharged hydrogen off-gas into the humidifier and to diffuse the hydrogen off-gas toward the lumen L in the center of the actual membrane humidifier is estimated using the determined gas flow velocity information and the length information of the related pipe (S404). In this regard, when determining the flow velocity information of the exhaust gas, as in step S403 of FIG. 4, the relationship "gas flow velocity=flow rate÷cross-sectional area of pipe" may be utilized. For example, "exhaust gas flow velocity" may be determined using "estimated exhaust gas flow rate÷(cross-sectional area of the pipe between the fuel discharge valve and the humidifier shell)", and "shell gas flow velocity" may be determined using "value measured by flow detector÷cross-sectional area of shell flow path". Other methods for accurately determining the gas flow rate of each pipe may be used to accurately estimate the gas flow velocity, and detectors for detecting parameters required therefore may further be used. Furthermore, general methods of estimating the amount of gas purged through the purge valve in the fuel cell system may be used to estimate the exhaust gas flow rate.

Furthermore, the relationship between the determined gas flow velocity information and the pipe length enables determination of the time required for the gas to completely pass through the pipe. The required time determined through the present process corresponds to the delay time taken from the opening of the fuel discharge valve to the actual hydrogen diffusion, so that the time required to compensate the target air flow rate may be determined in consideration of the present point. Furthermore, the present delay time may be equally applied to determine the end point of time of the target air flow rate compensation. For example, a time point at which a pre-determined delay time elapses from the closing time of the fuel discharge valve may be set as the end point of control of compensation for the air flow rate.

For example, the control of compensation for the target air flow rate is performed when the integral value of the flow velocity of the exhaust gas discharged through the fuel discharge valve after the fuel discharge valve is opened satisfies the condition pertaining to the pipe length (the length of pipe between the fuel discharge valve and the shell inlet of the humidifier).

When the delay time for determining the target air flow rate compensation time is determined, the step of determining the fuel diffusion amount in the humidifier, that is, the fuel diffusion amount per unit time from shell S to the lumen L of the humidifier, is performed (S405). In the present step, the fuel diffusion amount means the amount of fuel diffused per unit time, and is a value determined as a flow rate unit. The fuel diffusion amount may be determined depending on the membrane permeability and the concentration gradient between the shell S and the lumen L.

At the present time, the hydrogen concentration gradient in the humidifier may be determined in accordance with the following Equation 1:

$$\text{Hydrogen concentration gradient} = \frac{(C_{shell} - C_{lumen})}{D_{shell\text{-}lumen}} \quad \text{[Equation 1]}$$

wherein $C_{shell}$ represents a shell hydrogen concentration, $C_{lumen}$ represents a lumen hydrogen concentration, and $D_{shell\text{-}lumen}$ represents the distance between the center of the shell and the center of the lumen.

Here, each hydrogen concentration may be a value detected by the hydrogen concentration detector provided on the shell S and the lumen L. In contrast thereto, a method of estimating the hydrogen concentration based on other parameters, for example, an estimated concentration of hydrogen contained in the exhaust gas, may be used.

Furthermore, the membrane permeability of the humidifier depends on temperature, pressure, and flow rate, as in Equation 2 below, and the membrane permeability is determined using predetermined map data obtained based on results of tests on the temperature, pressure, and flow rate of the humidifier. Here, the temperature and pressure changes of the humidifier are insignificant, so mapping data of the membrane permeability, predetermined depending on the flow rate, may be used regardless of the temperature and pressure. Furthermore, the flow rate for determining the membrane permeability may be a value measured by the flow rate detector 31.

When the membrane permeability and the hydrogen concentration gradient are determined, these values may be multiplied to determine the fuel diffusion amount (g/s), as in step S405 of FIG. 4.

When the fuel diffusion amount per unit time is determined, the rate at which the oxygen concentration of the air supplied to the cathode of the stack through the actual air supply unit decreases may be determined using the fuel diffusion amount per unit time (S406).

In relation thereto, Equation 2 below is an equation for determining the oxygen concentration reduction based on the fuel diffusion amount.

$$\text{Oxygen concentration reduction proportion} = \frac{Q \text{ (Value detected by the flow rate sensor)}}{Q \text{ (Value detected by the flow rate sensor)} + \text{Fuel diffusion amount per unit time}} \quad \text{[Equation 2]}$$

That is, the value detected by the flow rate detector in Equation 2 above is an air flow rate detected by the flow rate detector 31, and means the flow rate at which air is actually supplied. Furthermore, the fuel diffusion amount per unit time means the amount of hydrogen off-gas that flows into the shell of the humidifier and diffuses toward the lumen per unit time. Therefore, the oxygen concentration reduction proportion refers to the extent to which the oxygen concentration of air supplied through the air supply unit in an abnormal state (when hydrogen off-gas is discharged) is lowered compared to the oxygen concentration of air supplied through the air supply unit in a normal state (when hydrogen off-gas is not discharged), and is caused by a phenomenon in which the hydrogen concentration is higher than in the atmosphere due to the hydrogen diffusing toward the lumen of the membrane humidifier. Accordingly, when the oxygen concentration reduction proportion is determined using Equation 2 above and the result is applied to the current target air flow rate as in Equation 3 below, it is possible to determine a target air flow rate configured for compensating for the reduction in oxygen concentration (S407).

$$\text{Compensated target air flow rate} = \frac{\text{Previous target air flow rate}}{\text{Oxygen concentration reduction proportion}} \quad \text{[Equation 3]}$$

When the compensated target air flow rate is determined, the air flow rate control device controls the number of air compressor rotations based on the compensated target air flow rate.

The air target flow compensation control may be maintained until the fuel discharge valve is closed after determining whether or not the fuel discharge valve is closed (S408). When the fuel discharge valve is closed, the target air flow compensation control may be terminated and the target air flow rate may be returned to a target air flow rate determined depending on the predetermined air flow rate map.

Meanwhile, the previously determined delay time may be further used to determine the end point of control of compensation for the target air flow rate. In the instant case, the air flow rate control device may be configured to determine whether or not the fuel discharge valve is closed and then terminate compensation of the target air flow rate after the delay time has elapsed from the time at which the fuel discharge valve is closed. When the target air flow rate compensation is terminated, the target air flow rate may be returned to a target air flow rate which is determined in accordance with the predetermined air flow rate map, as described above.

As apparent from the foregoing, the method for controlling compensation for an air flow rate when discharging hydrogen off-gas of the present disclosure has an effect of applying an optimized air target flow rate to the current state of the fuel cell system by determining a rate of decrease in the oxygen concentration of the supplied air due to hydrogen diffusing into the humidifier when discharging the hydrogen off-gas upon determination of the target air flow rate of the fuel cell system and then correcting the target air flow rate based thereon.

Furthermore, the method according to an exemplary embodiment of the present disclosure has effects of improving the durability and fuel efficiency of the fuel cell by applying a correction value for the optimized target air flow rate when discharging hydrogen off-gas and of improving the output performance of the fuel cell.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code that may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for controlling compensation for an air flow rate upon discharge of a hydrogen off-gas, the method comprising:
   determining, by a controller, whether a fuel discharge valve of a fuel cell system is opened;
   determining, by the controller, a fuel diffusion amount per unit time, wherein the fuel diffusion amount corresponds to an amount of the hydrogen off-gas discharged through the fuel discharge valve and then diffused into an air supply unit of the fuel cell system through a humidifier of the fuel cell system, wherein the fuel discharge valve is connected to the humidifier via a pipe to deliver the hydrogen off-gas to the humidifier;

determining, by the controller, an oxygen concentration reduction proportion from the determined fuel diffusion amount per unit time and flow rate information of the air supply unit; and compensating, by the controller, a target air flow rate according to the determined oxygen concentration reduction proportion.

2. The method of claim 1, further including:

controlling, by the controller, a number of rotations of an air compressor of the fuel cell system according to the compensated target air flow rate, wherein the humidifier is connected to the air compressor; and determining, by the controller, whether the fuel discharge valve is closed, terminating the compensating of the target air flow rate when the fuel discharge valve is closed, and returning the air flow rate to a target air flow rate determined according to a predetermined air flow rate map.

3. The method of claim 1, wherein the humidifier is a membrane humidifier, and wherein the fuel diffusion amount per unit time is determined according to a membrane permeability and a hydrogen concentration gradient between a shell and a lumen of the membrane humidifier.

4. The method of claim 1, further including determining a delay time based on a velocity of gas discharged through the fuel discharge valve and a length of the pipe between the fuel discharge valve and the humidifier, before determining the fuel diffusion amount per unit time, wherein the compensating of the target air flow rate includes initiating the compensating of the target air flow rate after the delay time elapses.

5. The method of claim 4, further including:

controlling, by the controller, a number of rotations of an air compressor of the fuel cell system according to the compensated target air flow rate, wherein the air compressor is connected to the humidifier; and determining, by the controller, whether the fuel discharge valve is closed, terminating the compensating of the target air flow rate when the fuel discharge valve is determined to be closed and the delay time then elapses, and returning the air flow rate to a target air flow rate determined according to a predetermined air flow rate map.

6. An apparatus for controlling compensation for an air flow rate upon discharge of a hydrogen off-gas, the apparatus being an air flow rate control device configured to control a flow rate of air supplied to a fuel cell cathode through an air supply unit of a fuel cell system, wherein the air flow rate control device is configured to:
determine whether a fuel discharge valve of the fuel cell system is opened and determine a fuel diffusion amount per unit time, wherein the fuel diffusion amount corresponds to an amount of the hydrogen off-gas discharged through the fuel discharge valve and diffused into an air supply unit of the fuel cell system through a humidifier of the fuel cell system, wherein the fuel discharge valve is connected to the humidifier via a pipe to deliver the hydrogen off-gas to the humidifier; and compensate a target air flow rate depending on an oxygen concentration reduction proportion, determined according to the determined fuel diffusion amount per unit time and flow rate information of the air supply unit.

7. The apparatus of claim 6, wherein the air flow rate control device is further configured to:

control a number of rotations of an air compressor of the fuel cell system according to the compensated target air flow rate, wherein the air compressor is connected to the humidifier;

determine whether the fuel discharge valve is closed and terminate the compensating the target air flow rate when the fuel discharge valve is determined to be closed; and return the air flow rate to a target air flow rate determined according to a predetermined air flow rate map when the compensating of the target air flow rate is terminated and control the number of rotations of the air compressor.

8. The apparatus of claim 6, wherein the humidifier is a membrane humidifier, and wherein the air flow rate control device is further configured to determine the fuel diffusion amount per unit time according to a membrane permeability and a hydrogen concentration gradient between a shell and a lumen of the membrane humidifier.

9. The apparatus of claim 6, wherein the air flow rate control device is further configured to:

determine a delay time based on a speed of gas discharged through the fuel discharge valve and a length of the pipe between the fuel discharge valve and the humidifier; and initiate the compensating of the target air flow rate after the delay time elapses.

10. The apparatus of claim 9, wherein the air flow rate control device is configured to:

control a number of rotations of an air compressor based on the compensated target air flow rate, wherein the air compressor is connected to the humidifier;

determine whether the fuel discharge valve is closed and terminate the compensating the target air flow rate when the fuel discharge valve is determined to be closed and the delay time then elapses; and return the air flow rate to a target air flow rate determined according to a predetermined air flow rate map when the compensating of the target air flow rate is terminated and control the number of rotations of the air compressor.

11. A fuel cell system comprising:

a fuel cell including an anode and a cathode;

a hydrogen supply unit configured to supply hydrogen to the anode;

an air supply unit configured to supply air to the cathode; and an air flow rate control device configured to control a target flow rate of air supplied to the air supply unit, wherein the hydrogen supply unit includes a fuel discharge valve connected to a hydrogen supply and configured to discharge a hydrogen off-gas, the air supply unit includes:
a humidifier configured to humidify air supplied to the cathode;
an air compressor connected to the humidifier and configured to pressurize air into the humidifier; and
an air flow rate detector configured to detect a flow rate of air supplied to the air supply unit, and the air flow rate control device is further configured to:
determine whether the fuel discharge valve is opened and determine a fuel diffusion amount per unit time when the fuel discharge valve is opened, wherein the fuel diffusion amount corresponds to an amount of the hydrogen off-gas discharged through the fuel discharge valve and diffused into the air supply unit of the fuel cell system through the humidifier; and compensate a target air flow rate depending on an oxygen concentration reduction proportion determined from the determined fuel diffusion amount per unit time and flow rate information of the air supply unit.

12. The fuel cell system of claim 11, wherein the air flow rate control device is further configured to:

control a number of rotations of the air compressor based on the compensated target air flow rate;

determine whether the fuel discharge valve is closed and terminate the compensating the target air flow rate when the fuel discharge valve is determined to be closed; and return the air flow rate to a target air flow rate determined in accordance with a predetermined air flow rate map when the compensating of the target air flow rate is terminated, and control the number of rotations of the air compressor.

13. The fuel cell system of claim 11, wherein the humidifier is a membrane humidifier, and wherein the air flow rate control device is configured to determine the fuel diffusion amount per unit time according to a membrane permeability and a hydrogen concentration gradient between a shell and a lumen of the membrane humidifier.

14. The fuel cell system of claim 11, wherein the fuel discharge valve is connected to the humidifier via a pipe to deliver the hydrogen off-gas to a shell inlet of the humidifier, and wherein the air flow rate control device is further configured to:

determine a delay time based on a velocity of gas discharged through the fuel discharge valve and a length of the pipe between the fuel discharge valve and the humidifier; and initiate the compensating of the target air flow rate after the delay time elapses.

15. The fuel cell system of claim 14, wherein the air flow rate control device is further configured to:

control a number of rotations of the air compressor based on the compensated target air flow rate;

determine whether the fuel discharge valve is closed and terminate the compensating the target air flow rate when the fuel discharge valve is determined to be closed and the delay time then elapses; and return the air flow rate to a target air flow rate determined according to a predetermined air flow rate map when the compensating of the target air flow rate is terminated and control the number of rotations of the air compressor.

* * * * *